United States Patent Office 3,785,951
Patented Jan. 15, 1974

3,785,951
ELECTROLYZER COMPRISING DIAPHRAGMLESS CELL SPACES FLOWED THROUGH BY THE ELECTROLYTE
Jacques Fleck, Kehl (Rhine), Germany, assignor to Krebs & Cie, Paris, France
Filed Feb. 25, 1972, Ser. No. 229,278
Claims priority, application Germany, Mar. 2, 1971, P 21 09 949.0
Int. Cl. B01k 3/00
U.S. Cl. 204—268                                    12 Claims

ABSTRACT OF THE DISCLOSURE

An electrolyzer of the type wherein electrolyte flows through diaphragmless cell-spaces which are in communication with each other only through a reaction vessel or a common collector and gas separator by means of pipe lines connecting given cell spaces thereto. Bipolar electrodes have lug-like anode portions protruding into the cell spaces adjacent lug-like cathode portions which also protrude into the cell spaces.

---

Figure 1:
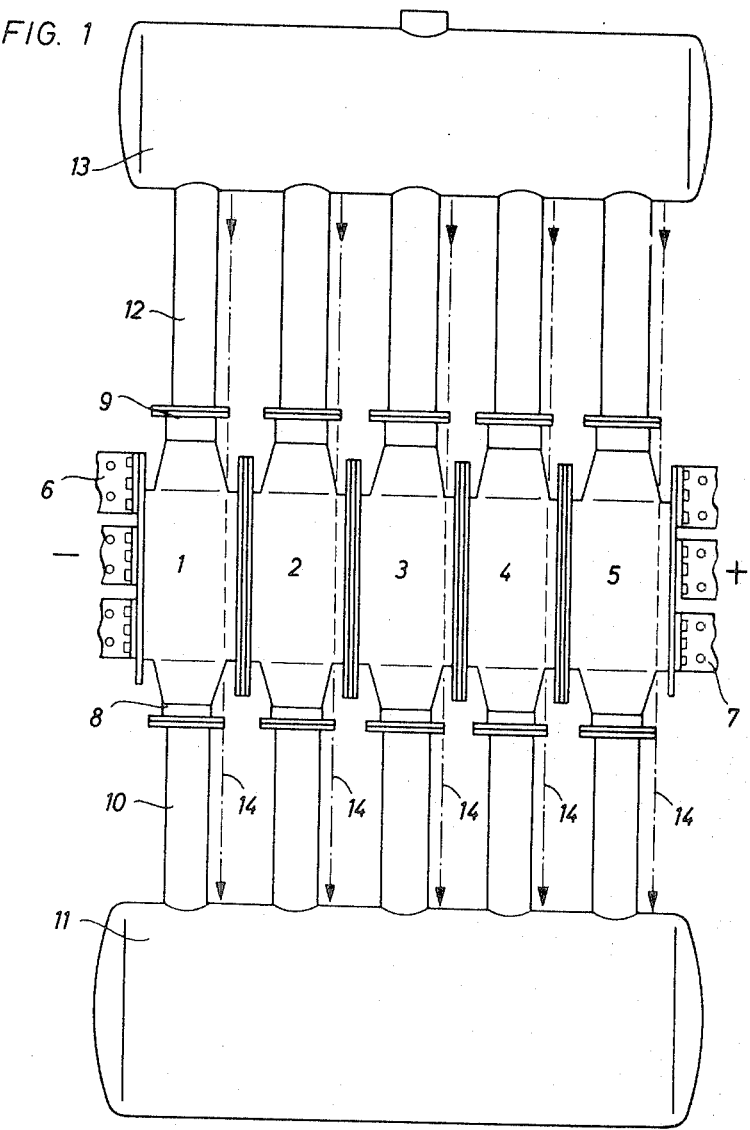

This invention relates to electrolyzers which comprise diaphragmless cell spaces flowed through by the electrolyte and containing bipolar electrodes, and which comprise means for reducing the parasitic currents.

The publication "Calculation of Current Density Distribution and Terminal Voltage for Bipolar Electrolyzers; Application to Chlorate Cells," by I. Rousar, Electrochemical Technology, May 1969, discloses an electrolyzer of this type, in which the means for reducing the parasitic currents are formed by insulating walls which are connected to the top and bottom portions of the bipolar electrodes and which have the task to lengthen the paths for the parasitic currents within the electrolyte in a manner such that the current paths for the parasitic currents have an increased resistance.

Yet this embodiment of the electrolyzer and of the bipolar electrodes arranged therein is unsuited in the fields of applications in which the electrolyte circulates through the electrolyzer at a high rate of flow, since the requirements of a small electrode spacing in the order of a few millimeters, furthermore of a large effective electrode surface and the achievement of a large cross-sectional area of flow nonwithstanding the low parasitic currents cannot be fulfilled simultaneously. Especially, the smaller the selected electrode spacing, the greater the danger of parasitic currents.

From French Pat. 1,502,793 is furthermore known an alkali-chlorate electrolysis process wherein the electrolyte circulates through the electrolyzer at a relatively high rate of flow and is passed up from the bottom through the electrolysis cells which are provided with monopolar electrodes and in which the electrolyte only resides a short time so as to permit chlorine formation at the anode and hypochlorite formation yet no discharge of the hypochlorite ions at the anode to form chlorate with free oxygen thereby deteriorating the current efficiency. In order to maintain the current density in the cell below a value about 3 ka./m.$^2$ without enlarging the effective cross section of the cell to thereby achieve a small consumption of energy the electrode surface in an apparatus for carrying out the known method is increased in that the cathodes and anodes are provided with vertical lugs aligned parallel to the direction of flow of electrolyte so that the cathode and anode have a substantially comb-like configuration in horizontal section and fit into each other or mesh. A similar structure has become known from U.S. Pat. 3,055,821 too.

Yet these known electrolyzers flowed through by the electrolyte are restricted—per apparatus unit—to the cell voltage since they are provided with monopolar electrodes so that, in contradistinction from the bipolar electrode cells, they cannot be operated with increased voltage per apparatus unit.

Finally, electrolysis cells provided with diaphragms—such as those known, e.g. from U.S. Pat. 1,327,094 and U.S. Pat. 3,539,491 or from German Auslegeschrift (patent publication) 1,102,111—are unsuited for carrying out electrolysis processes in which the electrolyte flows through the cell spaces at a relatively high speed, it being remarkable that in this case substantially no parasitic currents are observed anyway due to the provision of diaphragms.

The object of the invention is to solve the problem of designing an electrolyzer of the type described in the first paragraphs hereinabove so that when bipolar electrodes are used the parasitic currents will be maintained small even when the electrolyte flows at great flow velocities within the diaphragmless cell spaces.

According to the invention, this problem is solved in that the bipolar electrodes extend over lug-like anode and cathode portions protruding from said electrodes into adjacent cell spaces which communicate with each other exclusively via pipelines and reaction vessels as-well-as collectors and gas separators, respectively.

An electrolyzer of this type is adapted for electrolysis methods wherein no gases reacting with each other develop at the anode and cathode or no gases at all develop, wherefor the already mentioned alkali-chlorate electrolysis or the sodium electrolysis without diaphragm for producing hypochlorite, chlorate or perchlorate are mentioned here as examples. The proposed apparatus is adapted for electrolysis processes too, in which a vigorous forced circulation of the electrolyte in the cell is desired to avoid polarization of the electrolyte.

By the invention the additional advantage is achieved that the conductor pieces between the cell spaces, as are necessary for the electrolysis in systems having series connected monopolar electrode cells, are eliminated so that expensive conductor material can be saved while also saving of electrical energy is achieved which is lost as heat loss in the short connecting conductors between the cell spaces in the prior art electrolyzers. The parasitic currents are avoided to a far-going extent because the electrodes defining the cell spaces at opposite sides have a relatively great spacing from each other so that the shunt current paths extending over the pipelines and collectors and reactors, respectively, are considerably longer than the desired current paths through the spaces filled with electrolyte. Furthermore, there is a possibility to put high power output electrolyte cells so close together that the electrolyte can be fed to the cells from a common reaction vessel and then discharged from the cells and fed into a common collector and gas separator so that the entire electrolyzer outfit is greatly simplified. The commonness of reaction vessel and collector leads to an equalization of the concentrations so that in turn an equalization of the resistance of the individual cell spaces takes place which, in addition to the adaptation of the transition resistances is effective in the sense of a linearization of the voltage distribution. Moreover, the lug-like anode and cathode portions standing off the electrodes impart such a rigidity to the electrodes that bipolar electrode members can be held together with good electrical contact without any difficulties whatever.

Suitable further developments or embodiments of the invention are subject matter of the attached claims.

Figure 2:
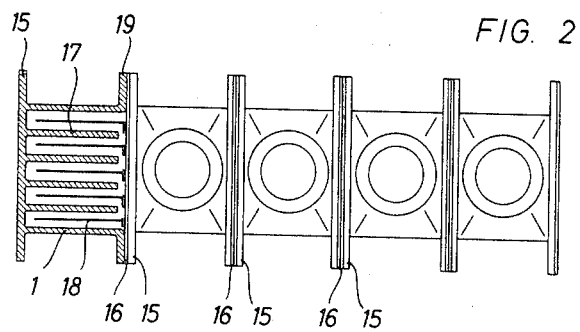
Figure 3:
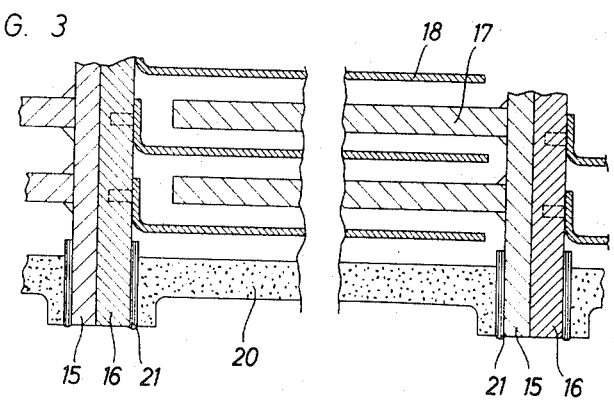
Figure 4:
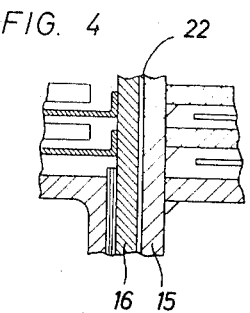
Figure 5:
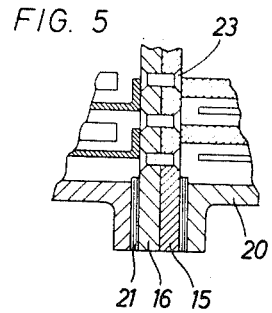
Figure 6:
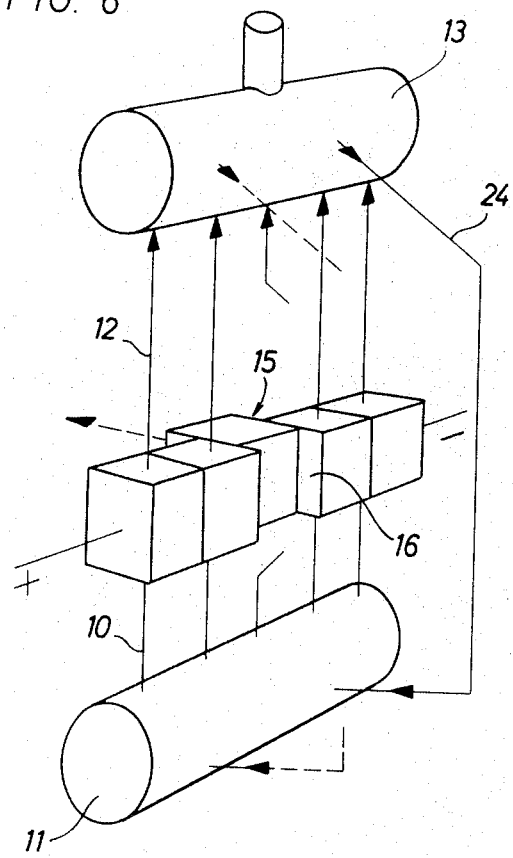

The invention will now be described in greater detail in a number of exemplary embodiments with reference to the enclosed drawings in which FIG. 1 shows a partially schematical front view of a part of the electrolyzer according to the invention, FIG. 2 shows a top plan view of the cell arrangement of the apparatus according to FIG. 1, a cell space being shown cut-off, FIG. 3 shows an enlarged sectional horizontal view through an electrolysis cell of the apparatus according to the invention, FIGS. 4 and 5 show details of the junction between two adjacent cell spaces, and FIG. 6 shows a schematic view of another embodiment of the electrolyzer according to the invention.

The invention is elucidated by way of example in the light of alkali chlorate electrolyzers, yet the invention is not restricted to electrolyzers of this type.

FIG. 1 shows directly adjacent electrolysis cell spaces 1 to 5 which are connected to conductor rails 6 at the cathode side for one thing and to conductor rails 7 at the anode side for another thing. The housings of the cell spaces 1 to 5 have a substantially box-shaped configuration and are provided with an electrolyte inlet 8 at the lower portion and an electrolyte outlet 9 at the upper portion thereof. The electrolyte inlet of all cell spaces 1 to 5 is each time connected via a pipeline 10 to a reaction vessel 11 common for all cell spaces, while the electrolyte outlets 9 of all cell spaces are in communication with a common collector and gas separator 13 via pipelines 12. Return lines leading from collector 13 to reaction vessel 11 are shown by dot-and-dash lines 14. Electrolyte withdrawal and feed lines provided at the collector 13 and reaction vessel 11 respectively are omitted in the view according to FIG. 1 for the sake of simplicity because they constitute no part of the invention.

From FIG. 1 it can be seen that the cell spaces 1 to 5 located side-by-side are directly adjacent each other, while the bipolar electrodes extending perpendicular to the direction of the electric current belong in common to adjacent cell spaces.

In FIG. 2, the mutually opposite bipolar electrodes of each cell space are designated with 15 and 16. In the illustrative embodiment described here the bipolar electrode consists of a part 15 of steel, stainless steel or chrome steel, while part 16 consists of titanium. The cell space 1 represented in section along a horizontal plane in FIG. 2 shows that the bipolar electrode part 15 is provided with lug-like or web-like electrode portions 17 extending in the transverse direction almost across the whole width of the cell space and in the vertical direction across the entire height of the electrolysis cell in a manner such that the electrode member formed of parts 15 and 17 has a comb-like configuration substantially in all horizontal cross-sections.

Also to part 16 are connected lug-like or ridge-like electrode portions which are designated by 18 in FIG. 2 and—in the present exemplary embodiments—have the form of activated titanium sheets which are connected to the bipolar electrode part 16, e.g. by screws.

According to one embodiment, the bipolar electrode parts 15 can be integrally connected to a frame-like housing of the cell spaces, as shown in FIG. 2. In this case, an insulating intermediate layer which, however, is not shown in detail in FIG. 2 and which has a sufficient thickness is arranged between a flange 19 and the part 16. For mounting the individual cell spaces, screw bolts which are passed through insulating sleeves and which are also omitted from the drawings for the sake of simplicity are used here in a suitable manner.

According to another embodiment, the frame-like housing of the cell spaces together with the electrolyte inlet 8 and the electrolyte outlet 9 arranged thereon constitutes a separate structural member 20 which, together with interposed seals 21, is clamped between the electrode parts 15 and 16, as shown schematically in FIG. 3. The connection of the electrode parts 15 and 16 can be achieved by screwing-together, by soldering-together, by plating or by electrically conductive adhesive bonding or by riveting. The two last-mentioned possibilities are shown in FIGS. 4 and 5 of the drawings. In FIG. 4, the adhesive layer of good electrical conductivity between the electrode parts 15 and 16 is denominated with 22 and represented in a greatly exaggerated thickness. In FIG. 5 is shown a series of rivets 23 which are passed through the electrode parts 15 and 16 and which are arranged as distributed sufficiently closely over the surface of parts 15 and 16. At any rate, there are no difficulties whatever to connect the electrode parts 15 and 16 to each other so that a voltage drop of less than 50 mv., based on a current density of 10 A./cm., takes place.

In case the electrode parts 15 and 16 are detachably clamped together, then for achieving a uniform contacting over the whole surface of contact a plastic connecting layer of good electrical conductivity can be interposed for example in the form of a conductive rubber or of an elastical or plastic mass enriched with conductive material.

In other cases it can be also advantageous to form the parts 15 and 16 integrally while to a corresponding plate to be then regarded as a structural unit one may attach the lugs or studs 17 at one side and the lugs 18 at the other side. It is also possible that either the bipolar electrode part 15 or the bipolar electrode 16 is formed as the mechanically supporting member, while the respective other part only constitutes a thin material layer for achieving the desired electro-chemical properties, on the electrode side concerned.

By the direct connection of the electrolysis cell spaces 1 to 5 it is achieved that the entire cell cross-section perpendicular to the general direction of the electrical current is loaded with current substantially uniformly, and that the individual cell spaces have nearly the same resistance sectionwise so that a uniform distribution of the output capacity is achieved in the case of the series connection of a plurality of cell spaces.

Eventually still existing resistance differences which might originate from a differing concentration of the electrolyte in the individual cell spaces are eliminated in that the reaction vessel 11 and the collector and gas separator 13 are provided as a common unit for the individual cell spaces according to an advantageous feature.

As shown schematically in FIG. 6, a few conduits 24 of a correspondingly larger cross-section can be employed for the recirculation from the collector and gas separator 13 to the reaction vessel 11, whereby permitting to economize pipe connections at the containers 11 and 13. In FIG. 6 there is moreover indicated the possibility that an individual electrolysis cell portion can be withdrawn and reinserted in the horizontal direction according to the add-a-member technique or unit-composed system after the detachment of the connections of the pipelines 10 and 12. In this case, the bipolar electrode parts 15 and 16 are detachably clamped together and are adapted to be displaced relative to each other at least in the horizontal direction after the clamping-together has been released. Such a construction renders the detachment of individual conductor connections between electrolysis cells to be exchanged unnecessarily in contradistinction from the prior art electrolyzers of the here considered type wherein this was necessary.

Finally, it is to be also noted that the electrode parts 15 and 16, when clamped together, fit each other with good contacting also just because the respective lug-like webs 17 and 18 connected to each respective electrode part impart a great rigidity and dimensional stability to said electrode parts. That is why the parts 15 and 16 do not tend to sagging but constitute a large, common area of contact when clamped together.

What is claimed is:

1. An electrolyzer of the type comprising diaphragmless cell spaces arranged adjacent one another in a row, said electrolyzer comprising:

end electrode plates located at the ends of said row, for maintaining respectively positive and negative potentials at the ends of said row;

a plurality of bipolar electrodes intermediate said end electrode plates, each having base electrode walls for respectively forming end walls of two adjacent diaphragmless cell spaces, and fingered plate-like electrode portions mounted on said base electrode walls and protruding into said adjacent cell spaces, with the fingered plate-like portions of adjacent bipolar electrodes being interlaced with, and relatively close to, one another in said adjacent diaphragmless cell spaces, but not touching one another, whereby said base electrode walls of said bipolar electrodes are spaced relatively far apart but yet said bipolar electrodes are relatively close together via said fingered plate-like portions and whereby, although said bipolar electrodes are relatively close together, they form relatively large cross sectional flow areas through said cell spaces;

a reaction vessel for providing a space for chemical reactions;

a collector and gas separator vessel for providing a supply of electrolyte;

a plurality of inlet pipelines, each one for providing communication exclusively between said collector and gas separator vessel and one of said cell spaces on an inlet side thereof; and a plurality of outlet pipelines each one providing communication exclusively between said reaction vessel and one of said cell spaces on an outlet side thereof which is opposite said inlet side;

at least one return line for providing communication between said reaction vessel and said collector and gas separator vessel;

wherein said inlet and outlet pipelines have the function of allowing a continuous flow of electrolyte from said collector and gas separator vessel through said cell spaces to said reactor vessel so that said cell spaces communicate with each other exclusively via said inlet and outlet pipelines and said vessels.

2. An electrolyzer as claimed in claim 1 wherein a section of each of said bipolar electrodes comprises a single integral member which forms said end wall and said fingered, plate-like portions.

3. An electrolyzer as claimed in claim 1 wherein said at least one bipolar electrode is integral with a frame-like cell space housing member which is separated from an adjacent bipolar electrode by an insulating ring.

4. An electrolyzer as claimed in claim 1 wherein each of said bipolar electrodes comprises different-material sections on each side thereof.

5. An electrolyzer as claimed in claim 4 wherein one of said different-material sections provides a supporting wall while the other of said different-material sections comprises a thinner layer secured to said supporting wall.

6. An electrolyzer as claimed in claim 5 wherein said bipolar electrodes are produced, layer-wise, by rivetting.

7. An electrolyzer as claimed in claim 5 wherein said bipolar electrodes are produced, layer-wise, by soldering.

8. An electrolyzer as claimed in claim 5 wherein said bipolar electrodes are produced, layer-wise by plating.

9. An electrolyzer as claimed in claim 5 wherein said bipolar electrodes are produced, layer-wise, by welding.

10. An electrolyzer as claimed in claim 5 wherein said bipolar electrodes are produced, layer-wise, by bonding by adhesive.

11. An electrolyzer as claimed in claim 5 wherein said bipolar electrodes are produced, layer-wise, by detachable and attachable clamps so that one of said cell spaces may be removed from said row.

12. An electrolyzer as claimed in claim 11 wherein those parts of said bipolar electrodes adjacent a cell space are adapted to be individually withdrawn from an assembly of plurality of cell spaces together with a housing enclosing the cell space concerned.

References Cited

UNITED STATES PATENTS

| 3,489,667 | 1/1970 | Colman | 204—268 |
| 1,485,461 | 3/1924 | Knowles | 204—256 |

FOREIGN PATENTS

| 1,185,507 | 3/1970 | Great Britain | 204—95 |

JOHN H. MACK, Primary Examiner

W. I. SOLOMON, Assistant Examiner

U.S. Cl. X.R.

204—95, 269, 286